June 22, 1937.
J. D. KINSLEY
2,084,644
ABRASIVE COMPOUND AND MEANS FOR UTILIZING SAME
Filed Dec. 4, 1931
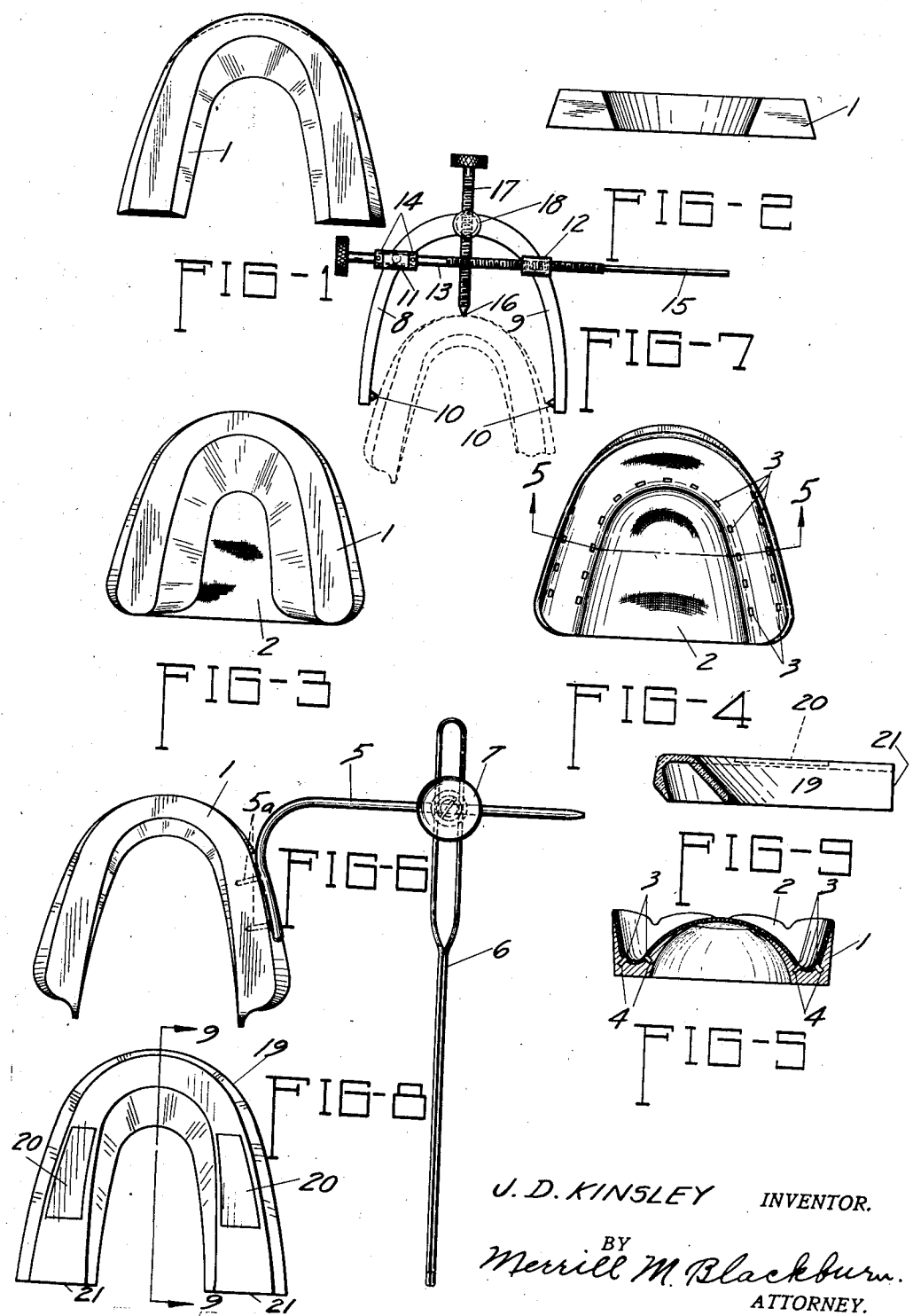
J. D. KINSLEY INVENTOR.
BY Merrill M. Blackburn.
ATTORNEY.

Patented June 22, 1937

2,084,644

UNITED STATES PATENT OFFICE 2,084,644

ABRASIVE COMPOUND AND MEANS FOR UTILIZING SAME

Jason D. Kinsley, Cedar Rapids, Iowa

Application December 4, 1931, Serial No. 578,870

9 Claims. (Cl. 32—19)

Primarily, this invention pertains to the art of dentistry and is herein described as a new and improved composition of matter and means for using an abrasive in grinding upper and lower bite-rims to natural anatomical relationship with each other and with the tempero-maxillary articulation, either within the patient's mouth or upon an articulator. However, this composition of matter is not limited in its use to the dental art.

Among the objects of my invention are to produce a composite abrasive mass, adapted to many uses where an abrasive agent is required, and particularly in dentistry for producing coordination of the occlusal surfaces of bite-rims; to produce an abrasive agent which is physically sensitive to change of temperature and which will be unyielding at a temperature slightly above the normal temperature of the human body and will become ductile, plastic and viscose at a higher temperature; to produce a composition of the nature indicated whose ductility, plasticity and viscosity are dependent upon the condition of a bonding element, which condition varies from approximately 108 degrees, Fahrenheit, to 212 degrees, Fahrenheit; to produce, for use as an abrasive agent, a composite mass whose surface only will mollify and become mucid through contact with water or aqueous solution; and such further objects, advantages and capabilities as will hereafter appear and as are inherent in the substance disclosed herein. My invention further resides in the combination, construction and arrangement of parts illustrated in the accompanying drawing and, while I have shown therein various means for employing the composition of matter to be hereinafter described, I desire it understood that this disclosure is illustrative only and is not to be interpreted in a limiting sense. In this specification and the appended claims, the word "water" is intended to include not only water, as such, but also aqueous solutions which will serve the purpose of the invention. Most water, as it comes from the mains of city water systems, is not pure water but contains other matter in solution and is, therefore an aqueous solution. Likewise, saliva is an aqueous solution. Also, some other solutions will serve the purpose of this invention and I intend that these shall be covered by the phraseology used. However, the word "moisture" is too inclusive, as it might cover strong acids, and I do not wish to have these included, unless it be in a very mild aqueous solution.

There are various substances and combinations of substances which may be utilized in carrying out the present invention but I prefer to use the following substances in the proportions given:

| | Parts |
|---|---|
| Gum damar | 8 |
| Beeswax | 1.25 |
| Gum tragacanth | 4.75 |
| French chalk | 10. |
| Emery crystals (size 80 to 100) | 35. |

The gum damar and beeswax are heated, melted and stirred together, after which the gum tragacanth and French chalk are sifted into the mass and stirred until substantially uniform and then the emery crystals are added and the mass is again stirred until substantially uniform. This mass, while its bond is in substantially fluid form, is now molded into the desired shapes and, upon cooling, is ready to be used.

A composition of matter such as described is solid at 108 degrees, Fahrenheit, begins to soften somewhat as its temperature rises above that point, becoming readily moldable at 130 degrees, Fahrenheit, or a little higher, and fluid at approximately 212 degrees. These characteristics make it possible to prepare the substance at a temperature of approximately that of boiling water, to mold it to fit human tissues at temperatures which are not intolerable to such tissues and yet to have the same solid at the normal temperatures of such tissues. These are desirable and, I might almost say, necessary characteristics of a substance which is to be used in the human mouth when getting bite-rims shaped to their natural anatomical relationship. In its solidified form or state, the bond holding such a composition of matter together is acted upon by water or aqueous solution but only at its surface and to a slight depth beneath the surface of the mass, the gum tragacanth uniting with the water, probably due to a colloidal action, the two forming a jelly-like coating which prevents action of further water and limits the penetration of the moisture into the mass. As such a surface is rubbed, it is readily disintegrated and abraded and bite-rims formed of such a composition are therefore readily ground to proper anatomical relationship.

A composition of matter for the purpose indicated should possess the properties of being firm, abrasive and easy to carve, while within the range of body temperature, and will become plastic, moldable and cohesive at higher temperatures. The four qualities last mentioned are not possessed by any of the bite-rim materials heretofore used in the dental art, so far as applicant is aware, neither do they possess the quality of becoming mucid (colloidal) in the presence of water. Abrasive materials for the purpose indicated, as heretofore prepared, consist essentially of plaster of Paris charged with carborundum, emery, silex, or the like. Such materials are filthy and mussy to use about an office, difficult to carve, slow to construct, and disagreeable to the patient, when in the mouth. Furthermore, when such a rim has been hardened, it cannot be added to with sufficient firmness to be practicable, nor without a great loss of time. The present composition, on the other hand, if it needs to be built up or re-formed in any region, may be softened by the application of heat, remolded to the desired form and, in case increase of bulk is desired, the material to be added is likewise softened by means of heat, and the latter is added to the former. Since the two are both cohesive and adhesive, the matter added becomes integral with the matter to which it is added and this is accomplished without any great loss of time. The plaster of Paris composition cannot be rendered plastic nor can it be molded into any other form. It has an objectionable tendency to crumble, especially in the thin areas of a bite-rim, under abrasion, is delicate to handle, and is difficult to work.

The new abrasive material, in contrast, may be supplied in forms ready for quick attachment to the crest of any type of base-plate desired for use in supporting material for bite-taking, or it may be molded to form about a patient's gum or a model thereof, and fashioned into a complete denture pattern or unit for both impression taking in its inner contour and for abrasive bite-grinding on its convexity. The new abrasive compound, being mucid upon its surface, while in the presence of water naturally in the mouth, is non-irritating and agreeable to the tissues of the mouth, while the plaster of Paris compounds are all irritating and very disagreeable to the tissues and the sense of taste and touch.

While the composition described above is capable, when in contact with water, of becoming mucid on its surface only and of then being erosively disintegrated, I do not desire to limit the invention to the use of the above materials since the physical conditions set forth above may be produced in a composite matter by the use of other materials, such as ponteonic or soft copal in place of gum damar, ozokorite in place of beeswax, talc or kaolin in place of chalk, carborundum in place of emery, and gelatin, soap, sugar or starch in place of gum tragacanth. It is also to be understood that other materials may be used to give to the composition the above described characteristics and yet be within the spirit of my invention.

I prefer, in practice, to keep on hand a supply of U-shaped forms of this abrasive composition, which forms I term upper and lower bite-blocks. When properly arranged upon a suitable support and placed in an edentulous mouth, these blocks reestablish dimensionally the general contour of the missing teeth, gums and alveolar tissue. Said blocks are made in graduated sizes, so as to accommodate any case, and each size is supplied with a snug fitting, flexible casing or shield preferably of soft rubber. This shield has on each side an area covering the occlusal surface of the bicuspid and molar regions, only, a rigid material which maintains the inner contour of the shield. The opposite side of the shield is open to receive and fit over the bite-block. The object of this shield is to cover the bite-block and preserve its form while the composite mass of which the block is composed is at a moldable temperature, and to supply adjustable means for the shaping and attachment of the mass to a base plate without objectionable distortion of its form. A further purpose of this shield is to protect the operator's fingers during the process of manipulation in compressing and molding the mass while causing its attachment and proper conformation with the crest of a bite-plate while the mass is in a heated condition.

I am aware that abrasive scouring blocks are made, using soap as a binder, but these will readily disintegrate if left in water, since the soap dissolves in the water and does not serve to prevent the water passing inwardly and softening the entire mass. My invention differentiates from this in that only the surface becomes soft and mucid and this soft surface material does not pass into the water but remains on the surface of the block as a protective film to prevent access of the liquid to the portions underneath, unless the surface is disturbed by an abrasive action.

I am also aware that grinding stones are made, using tenacious waterproof gums as a binder. My invention differs from these in that the mass is subject at its surface to the action of certain liquids, this action being colloidal, probably. Also, my abrasive mass becomes easily moldable in the hands upon a rise of its temperature to the desired amount, this temperature being controllable by proper modification of the composition. For example, one form of my composition is easily moldable in the hands at 123 degrees, Fahrenheit, when it may be formed to any desired shape. Upon reducing this composition to a temperature of 108 degrees, Fahrenheit, it immediately becomes solid and non-moldable. The abrasive mass may remain immersed in water for any length of time without disintegration, the colloidal activity being limited to a mucid film on the surface only. This film is useful as a vehicle for carrying away the debris of mechanical abrasion, when grinding in bite-rims or, in general use, for grinding purposes where a non-colloidal stone would clog, as in grinding lead or aluminum. The invention may also be utilized in the grinding of concrete surfaces, such as floors, or the like. Also, when utilized for lapidary purposes, the clearance of debris, produced by the vehicle as described, produces a more uniform surface, prevents gouging, as in the case of an unyielding grindstone or block, and increases abrasive action.

While this composition of matter may be used in various ways, I have chosen to illustrate its use in the art of denistry, inasmuch as it is intended primarily for that use. In the accompanying drawing forming a part hereof, Fig. 1 shows a plan view of a bite-block;

Fig. 2 is an end view from the lower side of Fig. 1;

Fig. 3 is a plan view showing a bite-block attached to an impression tray;

Fig. 4 is an inverted view of the structure shown in Fig. 3;

Fig. 5 is a transverse section substantially along the plane indicated by the line 5—5, Fig. 4;

Fig. 6 is a plan view of a bite-block having a support attached thereto;

Fig. 7 is a plan view of a different style of support, the bite-block being illustrated in position by means of dotted lines;

Fig. 8 is a plan view of a soft rubber shield for use in molding the composition by hand when heated to a point of plasticity;

Fig. 9 is a longitudinal section substantially along the plane indicated by the line 9—9, Fig. 8.

I have specified above different materials which may be used in the manufacture of this composition and it will therefore be understood that the abrasive compound formed will have slightly differing characteristics, depending upon the materials used in the making thereof. It will also be understood that the physical characteristics of this abrasive may be varied by varying the amounts of the constituents thereof. For example, decreasing the amount of beeswax or ozokorite raises the temperature at which the mass becomes plastic, and conversely. Whatever the composition, its characteristics should be such that it can be appropriately shaped, originally, into the desired forms and may be then subsequently changed or modified slightly from such forms to those desired by raising the temperature and applying the requisite pressure.

Figs. 1 and 2 show a bite-block 1 molded as indicated above into an appropriate size and form for use in the human mouth. Fig. 4 shows a tray 2 having parts cut and punched outwardly to form projecting anchor tongues upon the one face thereof. These openings are indicated in Fig. 4 by the numeral 3 and the tongues or projections in Fig. 5 by the numeral 4. I prefer to form the tray of very fine, flexible wire netting which is shaped to fit the patient's gum-ridge and surrounding tissues and to then stiffen this wire netting by dipping the same in a suitable molten metal. When this metal congeals in the meshes of the netting, it is in fused combination therewith, forming a quite rigid tray. The punchings 3 are then made with a suitable punch or other apparatus which will leave tongues outstanding from the face of this tray to which the bite-block is to be attached. Now, when the block 1 of abrasive material is applied to this surface of the tray and heated, it becomes plastic and can be molded with the fingers so as to adhere to the tray and be held in place thereon by engaging underneath the projecting parts of the tray. This step of the method of utilizing my present invention is disclosed in Fig. 3. The projecting tongues, formed by the punching operation referred to above, are illustrated in Fig. 5 where they are denoted by the numeral 4. By comparing Figs. 2 and 5, it will be seen how the bite-block has been molded to the surface of the tray when the former was applied to the latter.

In Fig. 6 there is shown a bite-block 1 having a bracket 5 attached thereto by means of pins 5a which are inserted into the material of the bite-block, preferably by heating the pins until they can be pushed into the block. The material is then allowed to cool and the bracket 5 will be held rigidly in place, as illustrated in this figure. An arm 6 may be clamped to the bracket 5 by any suitable securing clamp 7 and it will be noted that this arm 6 is adjustable longitudinally and rotationally with respect to the bracket 5, merely by means of loosening the clamp 7. This construction is utilized in making certain measurements and fittings and its description need not be proceeded with further.

The structure shown in Fig. 7 has the same purpose as the bracket 5 of Fig. 6 but is an improvement thereover. In this construction, the arms 8 and 9 are pivotally connected and each has adjacent its free end a point 10 which may be inserted into depressions formed in the surface of the bite-block. Sleeves 11 and 12 are fastened to the arms 8 and 9, the sleeve 12 being screw threaded for engagement by the threads of the screw 13. Collars 14 prevent slipping of the screw 13 with relation to the sleeve 11 and it will therefore be evident that, as the screw is turned, the arms 8 and 9 will be caused to approach or recede, depending upon the direction of rotation of the screw. This screw is provided with an extension 15 which serves the same purpose as the bracket 5 shown in Fig. 6. This structure is prevented from rotation about the points by engagement of the point 16 of screw 17 with a depression formed in the forward portion of the bite-block. The pivot member 18 is projected beyond the arms 8 and 9 and has a screw threaded opening therein for the reception of the screw 17. It is believed that the construction and operation of this device will be obvious from the foregoing description taken in connection with the annexed drawing.

As indicated above, the shield 19, shown in Figs. 8 and 9, is used in connection with the bite-block, when the latter is heated, so that the fingers of the operator will not be uncomfortably hot. This shield has plates 20 embedded in a face thereof to furnish stiffening for the rubber. However, if desired, these plates may be omitted, though it is felt that the construction is improved by their presence. As indicated at 21, the ends of the shield are left open to permit more perfect application thereof to the gum tissues. When this structure is used as a tray, in taking impressions, it is desirable that the crest should be quite rigid except for a short section at the forward end which makes it possible to bend it to fit the curvature of the gum ridge, laterally. The thickness of the walls of the tray and the space between them being narrow, there will be a tendency to hold the soft, yielding, heated compound under constant lateral pressure against the sides of the gum ridge while the dentist keeps pressure applied against the crest as the mass hardens under the cooling influence of a stream of cool water applied thereto. This insures a snug fit about the sides of the ridge and makes it certain that the material will fit into under-cuts which are so often present. Another advantage of the rubber tray, when used for impression work, is that it is easily separated from the compound, without injuring the surface thereof, and leaves the desired outer contour for the bite-unit.

It will of course be understood that the specific description of composition of matter, method of making same, and means of utilizing such composition may be departed from without departing from the spirit of my invention as set forth in this specification and the appended claims.

Having now described my invention, I claim:

1. An abrasive bite-rim composition comprising a mixture of gum damar, beeswax, gum tragacanth, French chalk and abrasive material, said mixture being solid at temperatures of 108 degrees F. and lower and becoming increasingly softer at temperatures above 108 degrees F. to a point of fluidity.

2. An abrasive bite-rim composition comprising a mixture of substances, part of which act as binder, part as abrasive, and part as filler, in which a part of the filler softens in the presence of water, causing disintegration at the surface of the mass and rendering it possible to readily remove abrasive particles from the surface of the composition by mechanical abrasion.

3. A substance in accordance with claim 2 in which the binder is insoluble by the action of water.

4. An abrasive composition of matter comprising in combination abrasive particles, a neutral substance serving as a filler, and a resinous bond, said composition of matter being solid at temperatures below 108 degrees F. and increasing in softness and moldability as the temperature is raised above that point, the surface of the mass becoming mucid upon coming into contact with water.

5. A composition of matter comprising granular particles of abrasive material, a resinous bond binding the particles together and a neutral filler modifying the texture of the mass and its changes under the influence of thermal changes, such filler also assisting in preventing deep penetration of water into the body of the mass.

6. A composite, cohesive, abrasive mass capable of becoming alternately rigid or plastic, said mass having the capability of being readily carved and of being added to by cohesion with another mass of like characteristics, said mass having a bonding element which becomes fluid under the influence of raised temperature, and the substance of the mass acting in the presence of water to produce what appears to be a colloidal film upon the surface of the mass, said film serving to seal the underlying mass against deeper penetration of the fluid.

7. An article of manufacture consisting of a dental bite-block, comprising abrasive, filler, and binder, said block being capable of being carved, readily, by means of edged tools and being capable of having its bulk increased by the cohesive miscible addition thereto of similar material, the temperature of the mass, if and when material is added thereto, being somewhere from one hundred ten degrees Fahrenheit (110° F.) to two hundred twelve degrees Fahrenheit (212° F.), at the time of addition, said block being capable of becoming mucid upon its surface when in contact with water and, when in this condition, of being easily reduced by mechanical erosion.

8. An abrasive scouring and cleaning block having a resinous bond which is rigid and firm at bodily temperature and becomes moldable and plastic on a rise of temperature, releasing its cohesiveness up to its fusing point at about 212 degrees F., said bond holding in combination a filler partly composed of soap and partly of chalk and having an abrasive agent.

9. An abrasive, grinding and polishing substance composed of a mass having a resinous, waxlike bond which is rigid and firm at bodily temperature and becomes moldable and plastic on a rise of temperature, releasing its cohesiveness at about 212 degrees F., and miscibly holding in combination an element which, when said substance is in contact with water, immediately forms on the surface thereof a useful solvent for greasy substance, stains and general household dirt, said solvent formation being limited to a shallow depth upon the immediate surface of the substance unless the action of the solvent is supplemented by heat or mechanical abrasion upon said surface, the composition of said substance possessing such physical properties as will supply practical and secure attachment for devices such as hubs, shafts and stems generally used for attachments to grinding and abrasive units.

JASON D. KINSLEY.